US011066968B1

(12) United States Patent
Nickols et al.

(10) Patent No.: US 11,066,968 B1
(45) Date of Patent: Jul. 20, 2021

(54) COOLING APPARATUSES FOR MARINE ENGINES HAVING A CRANKCASE AND AN INTAKE PLENUM

(71) Applicant: Brunswick Corporation, Mettawa, IL (US)

(72) Inventors: Thomas F. Nickols, Fond du Lac, WI (US); James E. Clevenger, Oshkosh, WI (US); Daniel P. Hoffman, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 16/713,802

(22) Filed: Dec. 13, 2019

(51) Int. Cl.
*F01M 5/00* (2006.01)
*F02M 35/10* (2006.01)
*F02F 7/00* (2006.01)
*F01P 3/18* (2006.01)
*F01P 3/12* (2006.01)

(52) U.S. Cl.
CPC ............... *F01M 5/002* (2013.01); *F01P 3/12* (2013.01); *F01P 3/18* (2013.01); *F02F 7/0021* (2013.01); *F02M 35/10268* (2013.01)

(58) Field of Classification Search
CPC ..... F01M 5/002; F02M 35/10268; F01P 3/12; F02F 7/0021
See application file for complete search history.

(56) References Cited

U.S. PATENT DOCUMENTS

| 2,354,227 A  * | 7/1944 | Szekely ................. F02B 25/00 123/54.7 |
| 8,696,394 B1 * | 4/2014 | Langenfeld ............ F01P 3/202 440/880 |
| 9,457,881 B1 | 10/2016 | Belter et al. |
| 10,006,419 B1 | 6/2018 | Hoffman et al. |
| 10,006,549 B2 | 6/2018 | Webster |
| 10,344,639 B1 | 7/2019 | Nickols et al. |

* cited by examiner

*Primary Examiner* — Kevin A Lathers
(74) *Attorney, Agent, or Firm* — Andrus Intellectual Property Law, LLP

(57) ABSTRACT

A marine engine has a crankcase containing lubricant; an intake plenum for conveying intake air for combustion in the marine engine; and a cooling apparatus located between the crankcase and the intake plenum. The cooling apparatus is configured to cool both the lubricant in the crankcase and the intake air in the intake plenum.

20 Claims, 6 Drawing Sheets

US 11,066,968 B1

COOLING APPARATUSES FOR MARINE ENGINES HAVING A CRANKCASE AND AN INTAKE PLENUM

FIELD

The present disclosure generally relates to marine engines and more particularly to vertically-oriented engines, such as outboard marine engines, having a crankcase and an intake plenum for conveying intake air for combustion in the engine.

BACKGROUND

The following U.S. Patents are incorporated herein by reference in entirety:

U.S. Pat. No. 10,344,639 discloses a marine engine having a crankcase with a crankshaft that rotates about a vertical crankshaft axis; a cover on the crankcase; and a cooling member disposed in the crankcase. The cooling member has an inner surface that faces the crankshaft and an outer surface that faces the cover. The cooling member is configured such that rotation of the crankshaft causes lubricant in the crankcase to impinge on and drain down both the inner and outer surfaces of the cooling member.

U.S. Pat. No. 10,006,549 discloses an outboard marine engine having a crankcase; a crankshaft disposed in the crankcase and being rotatable about a crankshaft axis; a crankcase cover on the crankcase, the crankcase cover enclosing the crankshaft in the crankcase; and an air intake plenum that is integrally formed with the crankcase cover. The air intake plenum conveys intake air for combustion in the outboard marine engine.

U.S. Pat. No. 9,457,881 discloses an outboard marine engine having an engine block; a crankcase on the engine block; a crankshaft disposed in the crankcase for rotation about a crankshaft axis; a cover on the crankcase; a bedplate disposed between the engine block and the cover, the bedplate having a plurality of bearings for supporting rotation of the crankshaft; and a cooling water jacket that extends parallel to the crankshaft axis along a radially outer portion of the plurality of bearings. The cooling water jacket carries cooling water for cooling the plurality of bearings and an oil drain-back area is located adjacent to the cooling water jacket. The oil drain-back area drains oil from the crankcase.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter. In certain examples disclosed herein, a marine engine has a crankcase containing lubricant; an intake plenum for conveying intake air for combustion in the marine engine; and a cooling apparatus located between the crankcase and the intake plenum. The cooling apparatus is configured to cool both the lubricant in the crankcase and the intake air in the intake plenum.

BRIEF DESCRIPTION OF THE DRAWINGS

Examples of cooling apparatuses for outboard marine engines are described with reference to the following drawing figures. The same numbers are used throughout to reference like features and components.

DETAILED DESCRIPTION

Figure 1:
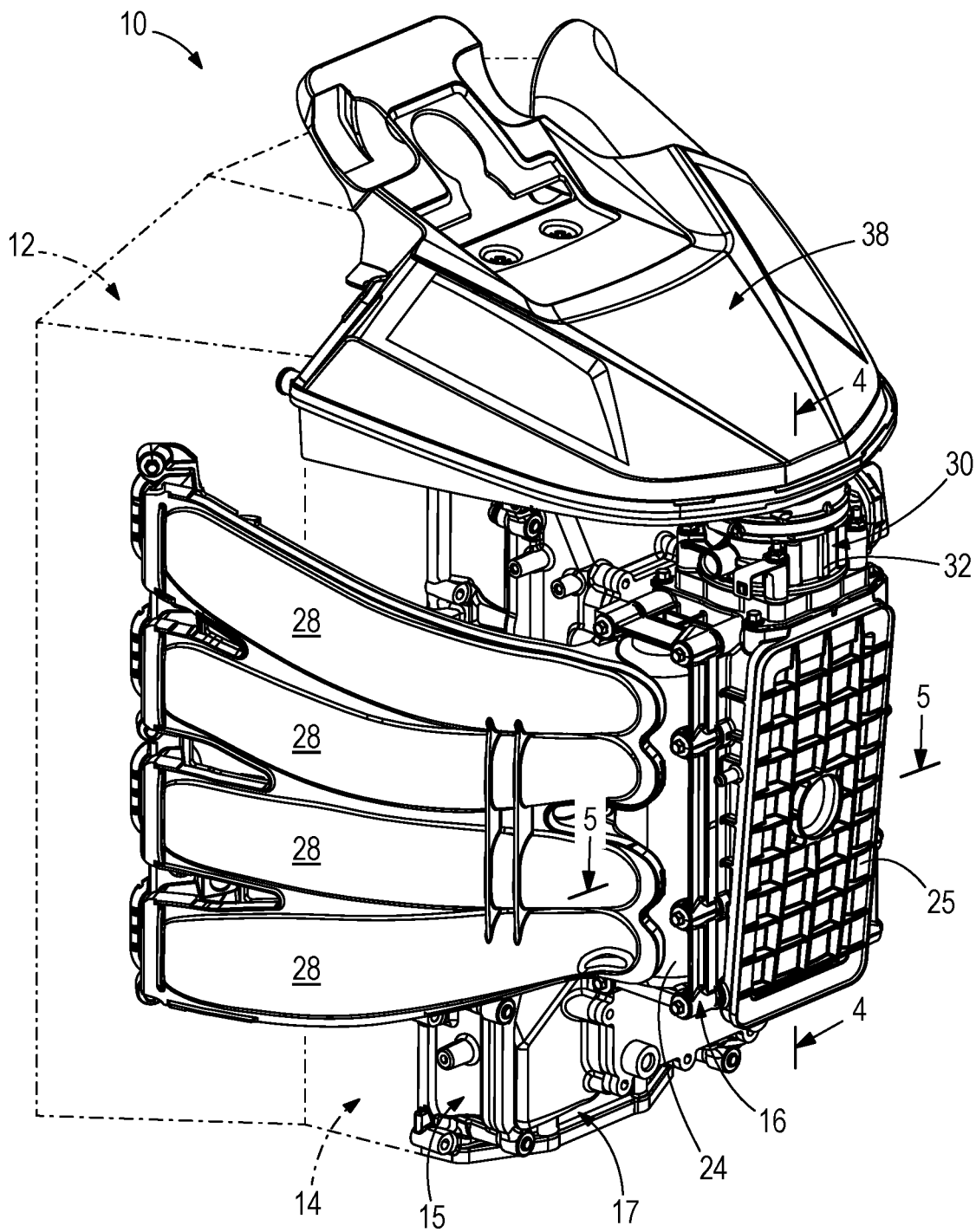
FIG. 1 is a perspective view of an outboard marine engine having a crankcase and an intake plenum for conveying intake air for combustion in the marine engine.
Figure 2:
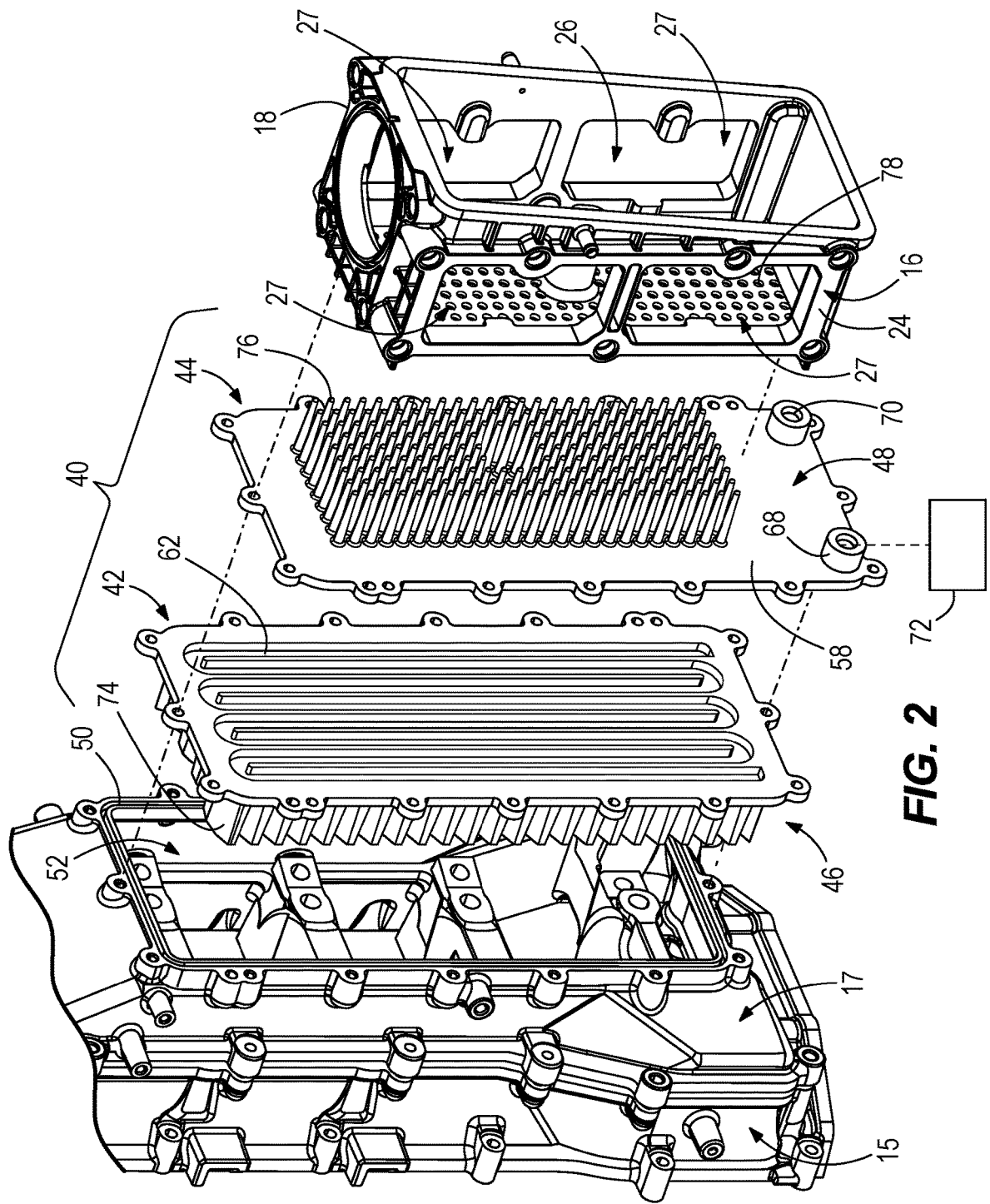
FIG. 2 is an exploded view, showing a cooling apparatus according to the present disclosure, located between the crankcase and the intake plenum.
Figure 3:
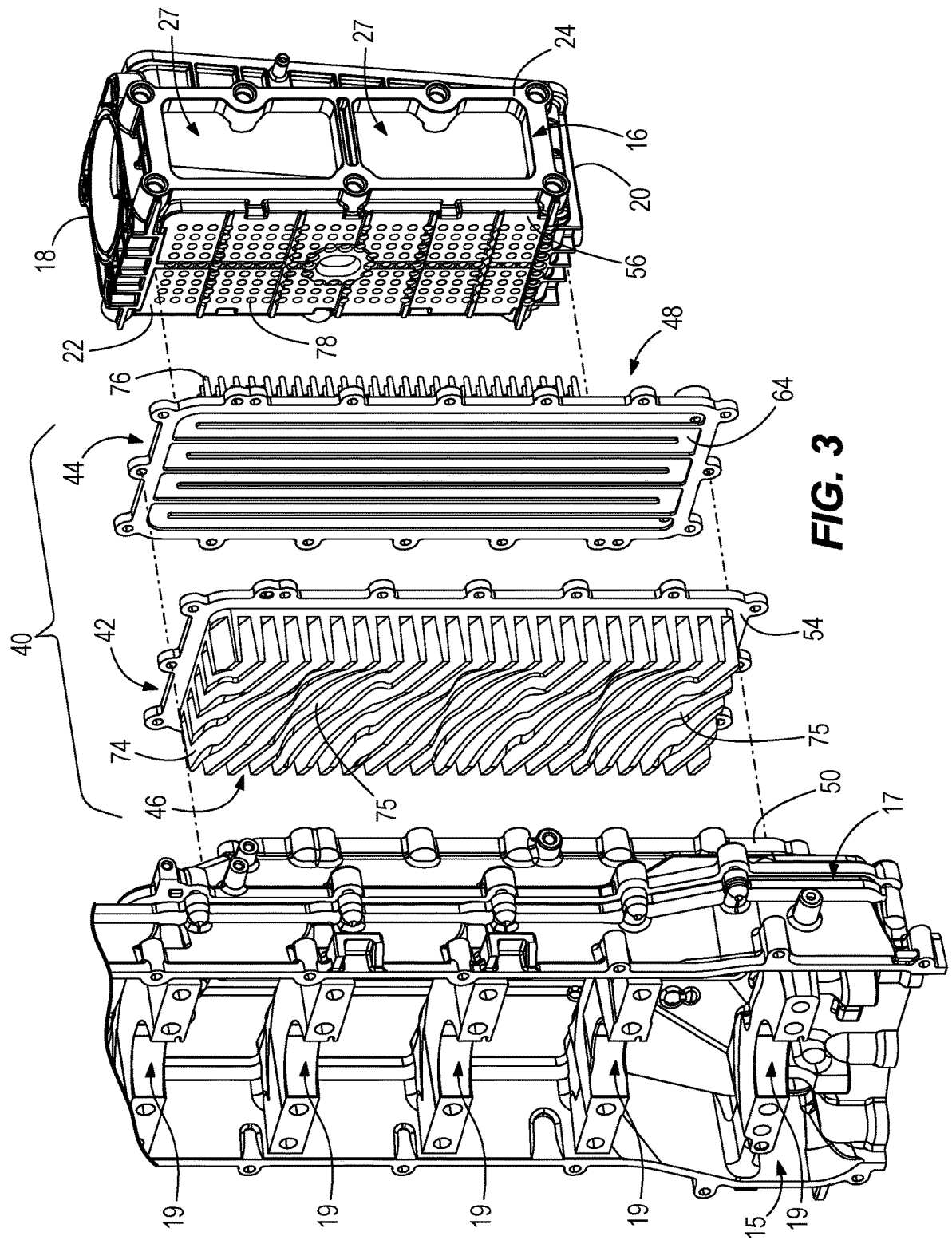
FIG. 3 is a view like FIG. 2, shown from the opposite side.

FIGS. 1-5 depict an example of an outboard marine engine 10 according to the present disclosure. The marine engine 10 includes a cylinder block 12. Although not shown, the cylinder block 12 can include first and second rows of vertically-aligned piston-cylinders that are mounted transversely to each other in a conventional V-style configuration. This is schematically shown via dash-and-dot lines in FIG. 1. One example of a suitable V-style configuration is disclosed in U.S. Pat. No. 9,457,881. The outboard marine engine 10 can be a six-cylinder arrangement; however the concepts of the present disclosure are equally applicable to single cylinder engine arrangements, and/or engine arrangements having more cylinders, such as two-, four-, or eight-cylinder arrangements and/or the like. As is conventional, combustion within the noted piston-cylinders induces reciprocal movement of connecting rods (not shown), which causes rotation of a crankshaft, which extends along a vertical axis A, shown in FIG. 4.

The marine engine 10 has a crankcase body 14 on the cylinder block 12 and a bedplate 15 on the crankcase body 14. Together the crankcase body 14 and bedplate 15 support the vertically-oriented crankshaft (not shown) via associated bearings 19, all as is conventional. A crankcase cover 17 is mounted on the crankcase body 14 and partially encloses the crankshaft and bearings 19 therein. In combination, the crankcase body 14, bedplate 15, and crankcase cover 17 are sometimes generally referred to as the "crankcase", and an example of such a prior art combination is disclosed in the above-incorporated U.S. Pat. No. 9,457,881. As further described herein below, a novel cooling apparatus 40 configured according to the present disclosure is coupled to the crankcase body 14, via the crankcase cover 17 and bedplate 15, and further encloses the crankshaft and bearings 19 therein.

The outboard marine engine 10 has an air intake plenum 16 for conveying intake air for combustion in the marine engine 10. The illustrated air intake plenum 16 has a rectangular box-shape, with a top wall 18, a bottom wall 20 located opposite the top wall 18, a front wall 22 that faces the crankcase cover 17, and opposing port and starboard sidewalls 24. A removable cover 25 is mounted to and encloses the aftward side of the air intake plenum 16, opposite the crankcase cover 17. Together the top wall 18, bottom wall 20, front wall 22, sidewalls 24 and cover 25 define an open interior 26 for receiving and conveying intake air as further described herein below. Referring to FIG. 1, a plurality of intake runners 28 laterally convey the intake air from opposite sides of the air intake plenum 16 to cylinder heads (not shown) on the marine engine 10, for combustion therein. The sidewalls 24 have openings 27 therein for laterally communicating the intake air from the open interior 26 to the intake runners 28.

A conventional throttle mechanism 30 is located on top of the air intake plenum 16 and is configured to throttle intake air to the intake air plenum 16. The throttle mechanism 30 includes a throttle body 32 that is coupled to the intake air plenum 16 along the top wall 18. The throttle body 32 includes a downwardly-facing mounting surface 34 that is coupled to an upwardly-facing mounting surface 36 on the air intake plenum 16. Optionally, a resilient member or isolator 37 is sandwiched between the downwardly-facing mounting surface 34 and the upwardly-facing mounting surface 36 and provides vibration dampening for the throttle mechanism 30 during operation of the marine engine 10. The top wall 18 has an opening therein for receiving downward flow of intake air from the throttle mechanism 30. A top cowling or air intake hood 38 is located on top of the throttle mechanism 30 and conveys air from the surrounding atmosphere and air from under an outer cowling (not shown) on the marine engine 10 to the throttle body 32, as shown by arrow 39 in FIG. 5. The air intake plenum 16 is configured to laterally convey the intake air to the opposing intake runners 28. It should be noted that although the throttle body 32 is mounted on top of the air intake plenum 16, in other arrangements, the throttle body 32 could be mounted to the sides or bottom of the air intake plenum 16 or elsewhere.

During research and experimentation, the present inventors determined that relatively high oil temperatures in the engine environment can cause engine lubricant to degrade and can also increase the temperature of seals and other components within the engine. The high temperatures require more robust seals and components, thus adding cost. In addition, windage friction in the crankcase causes a loss of power. Windage friction is affected by the amount of lubricant that flows through the main bearings and subsequently into the crankcase and the rotating and reciprocating cranktrain (e.g. crankshaft and connecting rods). The inventors have found that effectively cooling the main bearing bulkheads in the crankcase reduces thermal expansion of the bulkheads, which in turn reduces the running clearances of the main bearings. This results in less flow of lubricant, which leads to cooler lubricant and less power lost to friction. During research and experimentation, the present inventors have also determined that it is desirable to cool intake air provided to the marine engine for combustion therein. Cooling of the intake air increases charge density, therefore providing increased mass flow of oxygen available for combustion in the cylinder. Through research and experimentation, the present inventors further realized that it would be desirable to achieve the above-explained cooling advantages with an efficiently constructed apparatus having a relatively small package size. The present disclosure is a result of these efforts.

Referring to FIGS. 2-6, a novel cooling apparatus 40 is configured according to the present disclosure and advantageously cools both lubricant within the crankcase body 14, bedplate 15 and crankcase cover 17, as well as the intake air in the intake plenum 16. The cooling apparatus 40 is located between the crankcase cover 17 and the intake plenum 16. In the illustrated example, the cooling apparatus 40 includes first and second plates 42, 44 that are together sandwiched between the crankcase cover 17 and the intake plenum 16. As such, the cooling apparatus 40 is sandwiched between and encloses both the crankcase body 14 and the intake plenum 16, and has a first side 46 that faces and encloses the crankcase body 14 and an opposite, second side 48 faces and encloses the intake plenum 16. More particularly, the crankcase cover 17 has a perimeter mounting flange 50 that surrounds an opening 52 through the crankcase cover 17, exposing the interior of the crankcase body 14 and bedplate 15, including the noted crankshaft and bearings 19. The first side 46 of the cooling apparatus 40 has a perimeter mounting face 54 that faces and abuts the perimeter mounting flange 50 when the air intake plenum 16 and cooling apparatus 40 are mounted to the marine engine 10. The front wall 22 of the air intake plenum 16 has a perimeter mounting face 56 and the second side of the cooling apparatus 40 has a perimeter mounting face 58 that faces and abuts the perimeter mounting face 56 when the air intake plenum 16 and cooling apparatus 40 are mounted to the marine engine 10. The respective components are clamped together in the manner shown in the drawings by, for example fasteners or other similar connection.

Figure 4:
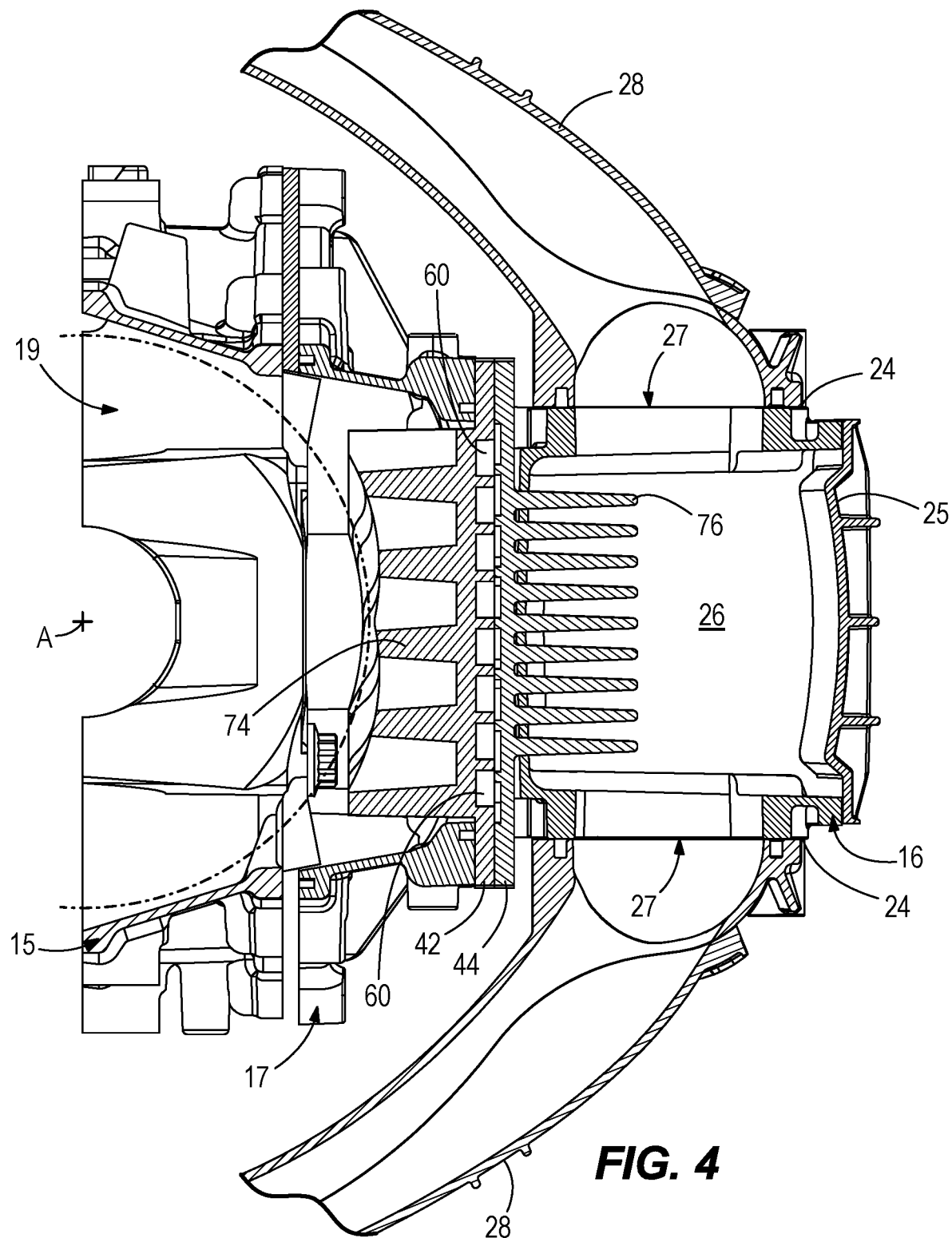
FIG. 4 is a view of section 4-4, taken in FIG. 1.
Figure 5:
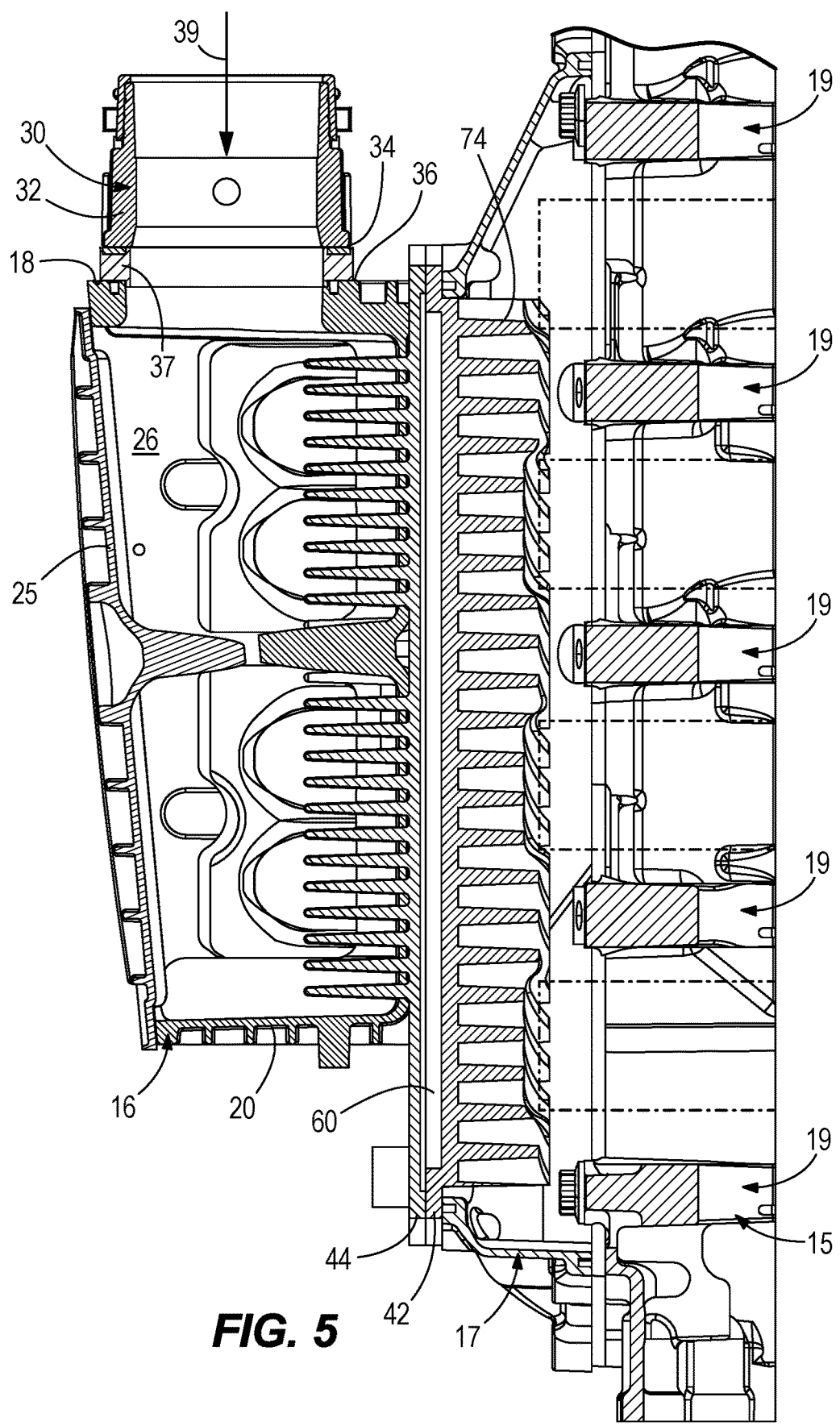
FIG. 5 is a view of section 5-5, taken in FIG. 1.
Figure 6:
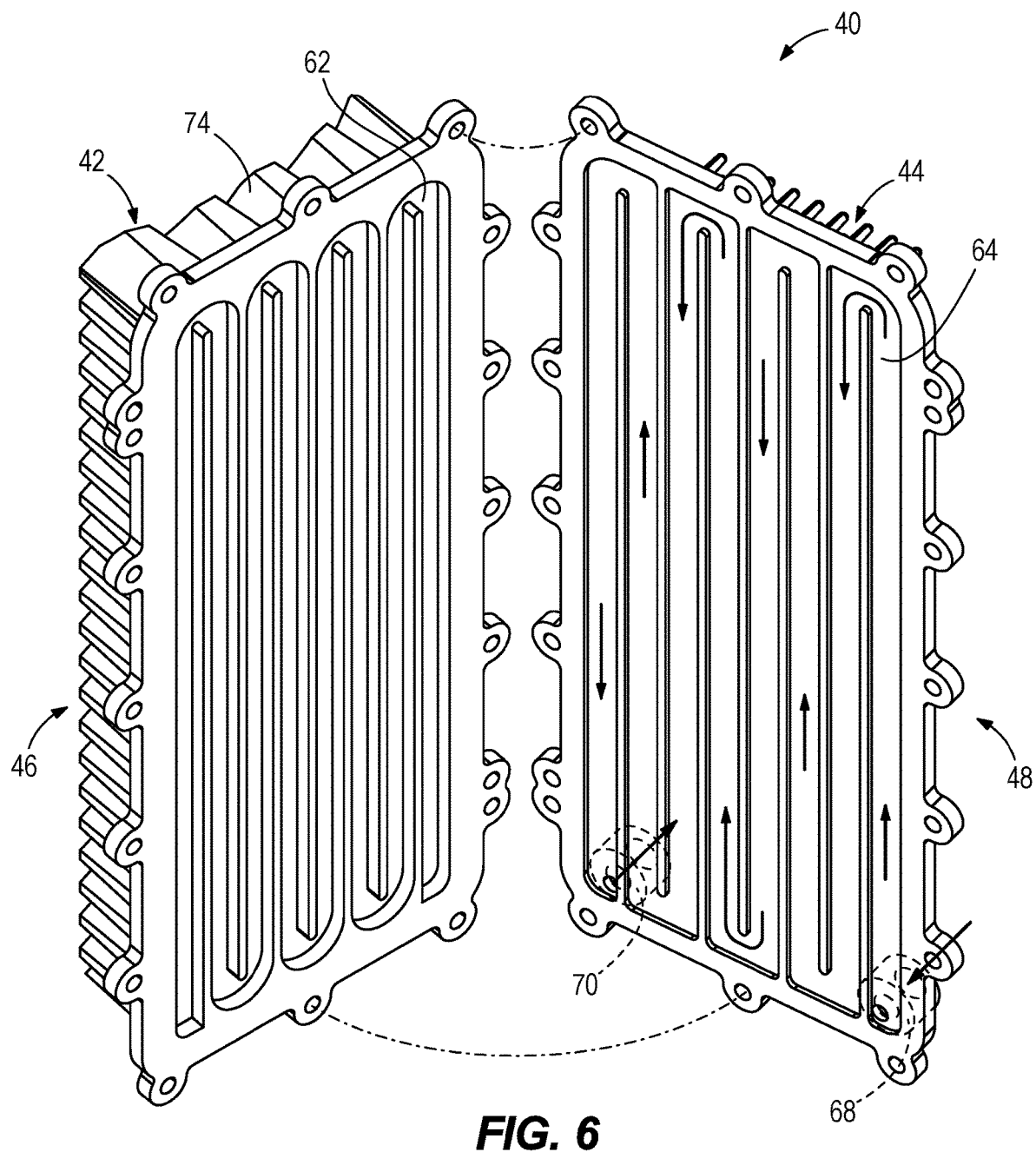
FIG. 6 is an exploded view of the cooling apparatus, showing flow of cooling fluid therein.

Referring to FIGS. 4 and 5, the first second plates 42, 44 together define a plurality of elongated channels 60 that convey the cooling water back and forth (i.e., up and down and generally parallel with respect to the vertically-oriented crankshaft of the outboard marine engine, in series and in a serpentine path. Referring to FIG. 6, in particular, the first plate 42 has a plurality of elongated recesses 62 and the second plate has a corresponding plurality of elongated recesses 64. When the first and second plates 42 and 44 are sandwiched together and clamped between the crankcase cover 17 and the air intake plenum 16, the recesses 62, 64 together define the channels 60 through which cooling fluid (e.g. water from the surrounding body of water in which the marine engine 10 is operated) is conveyed, as shown by arrows in FIG. 6. An inlet port 68 is located at the bottom of the second plate 44 and conveys the cooling fluid into one end of the elongated channels 60. An outlet port 70 is located at the bottom of the second plate 44 and discharges the cooling fluid from the other end of the elongated channels 60. As such, the inlet port 68 and the outlet port 70 are located on the same end of the cooling plate 44. A pump 72 is configured to pump the cooling fluid through the cooling channels 60 via the inlet and outlet ports 68, 70. The pump 72 is conventional and can be any mechanically- and/or electrically-powered pump that is suitable for pumping cooling fluid through the cooling apparatus 40, as herein described. The first and second plates 42, 44 are preferably made of metal and/or the like so that the plates efficiently transfer heat amongst the relatively cold cooling fluid flowing there through and the adjacent lubricant in the crankcase body 14 and intake air in the intake air plenum 16.

The first plate 42 has a plurality of cooling members that extend into the opening 52 in the crankcase cover 17 and thus into the interior of the crankcase. The cooling members are cooled by the relatively cold cooling water flowing through the plurality of elongated channels 60. The particular configuration of the cooling members can vary, and in the illustrated example are fins 74 across which the lubricant drains by gravity. The fins 74 transversely extend with respect to the vertical crankshaft, thus promoting drainage and facilitating heat exchange between the relatively cold fins and the relatively hot lubricant in the crankcase. Many of the fins 74 have contoured and/or beveled outer edges 75 (see FIG. 3) which form scrapers for scraping lubricant off of the rotating components.

The second plate 44 has a plurality of cooling members that are opposed to the fins 74 and that extend into the interior 26 of the air intake plenum 16, and amongst which the intake air flows. The cooling members are cooled by the relatively cold cooling water flowing through the plurality of elongated channels 60. The particular configuration of the cooling members can vary, and in the illustrated example are pins 76 that extend forwardly relative to the vertical crankshaft. The intake air flowing through the intake plenum 16 flows amongst the pins 76 and thus facilitate heat exchange between the relatively cold pins 76 and the relatively hot intake air (i.e. charge air) in the air intake plenum 16. In the illustrated example, the front wall 22 of the air intake plenum 16 has a plurality of holes 78 that correspond to the pins and through which the pins extend when the second plate 44 is mounted to the air intake plenum. The mating relationship of the pins and plurality of holes 78 advantageously promotes proper alignment of the second plate 44 and the air intake plenum 16 during assembly.

The present disclosure thus provides a novel cooling apparatus that efficiently and effectively cools both the lubricant in the crankcase and the intake air in the air intake plenum, in relatively-small package size that is efficiently manufactured and assembled.

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A marine engine comprising a crankcase having an interior containing lubricant, an intake plenum for conveying intake air for combustion in the marine engine, and a cooling apparatus located between the crankcase and the intake plenum, the cooling apparatus being configured to cool both the lubricant in the crankcase and the intake air in the intake plenum, wherein the cooling apparatus covers an opening in the crankcase such that removal of the cooling apparatus from the crankcase exposes the interior of the crankcase.

2. The marine engine according to claim 1, wherein the cooling apparatus is sandwiched between and encloses both the crankcase and the intake plenum.

3. The marine engine according to claim 2, wherein the cooling apparatus further comprises a plurality of cooling members extending into the crankcase, across which the lubricant drains in the crankcase.

4. The marine engine according to claim 3, wherein the plurality of cooling members comprises fins.

5. The marine engine according to claim 2, wherein the cooling apparatus further comprises a plurality of cooling members extending into the intake plenum and amongst which the intake air flows through the intake plenum.

6. The marine engine according to claim 5, wherein the plurality of cooling members comprises pins that extend through holes in the intake plenum, wherein the mating of the pins in the holes aligns the cooling apparatus with the intake plenum.

7. The marine engine according to claim 1, wherein the cooling apparatus comprises a first side facing the crankcase and enclosing the crankcase and a second side facing the intake plenum and enclosing the intake plenum, wherein the crankcase comprises a perimeter mounting flange that surrounds the opening, wherein the first side of the cooling apparatus comprises a perimeter mounting face that faces the perimeter mounting flange of the crankcase, wherein the intake plenum comprises a perimeter mounting face, and wherein the second side of the cooling apparatus comprises a perimeter mounting face that faces the perimeter mounting face of the intake plenum, and wherein the crankcase, cooling apparatus and intake plenum are clamped together.

8. The marine engine according to claim 7, wherein the cooling apparatus further comprises a first plurality of cooling members extending from the first side into the crankcase.

9. The marine engine according to claim 8, wherein the cooling apparatus further comprises a second plurality of cooling members extending from the second side into the crankcase.

10. A marine engine comprising a crankcase containing lubricant, an intake plenum for conveying intake air for combustion in the marine engine, and a cooling apparatus located between the crankcase and the intake plenum, the cooling apparatus being configured to cool both the lubricant in the crankcase and the intake air in the intake plenum, wherein the cooling apparatus comprises a first side facing the crankcase and enclosing the crankcase and a second side facing the intake plenum and enclosing the intake plenum, wherein the cooling apparatus further comprises a first plurality of cooling members extending from the first side into the crankcase, wherein the cooling apparatus further comprises a second plurality of cooling members extending from the second side into the crankcase, and wherein the first plurality of cooling members comprises cooling fins across which the lubricant drains in the crankcase and wherein the second plurality of cooling members comprises cooling pins amongst which the intake air flows through the intake plenum.

11. A marine engine comprising a crankcase containing lubricant, an intake plenum for conveying intake air for combustion in the marine engine, and a cooling apparatus located between the crankcase and the intake plenum, the cooling apparatus being configured to cool both the lubricant in the crankcase and the intake air in the intake plenum, wherein the cooling apparatus further comprises a plurality of fins across which the lubricant drains in the crankcase, and an opposing plurality of pins amongst which the intake air flows through the intake plenum.

12. The marine engine according to claim 11, wherein the crankcase comprises a crankcase body, a bedplate on the crankcase body, and a crankcase cover on the bedplate.

13. The marine engine according to claim 12, wherein the cooling apparatus is removably mounted to the crankcase cover and encloses the crankcase.

14. The marine engine according to claim 13, wherein the cooling apparatus comprises first and second plates that are sandwiched between the crankcase cover and the intake plenum, and wherein the plurality of fins extend from the first plate into the crankcase and wherein the pins extend from the second plate into the intake plenum.

15. A marine engine comprising a crankcase containing lubricant, an intake plenum for conveying intake air for combustion in the marine engine, and a cooling apparatus located between the crankcase and the intake plenum, the cooling apparatus being configured to cool both the lubricant in the crankcase and the intake air in the intake plenum, wherein the cooling apparatus comprises first and second plates sandwiched between the crankcase and the intake plenum.

16. The marine engine according to claim 15, wherein the first plate has a plurality of elongated channels that convey the cooling water back and forth with respect to the crankcase in a serpentine path.

17. The marine engine according to claim 16, wherein the cooling apparatus has an inlet port for conveying the cooling water to the plurality of elongated channels and an outlet port for discharging the cooling water from the plurality of elongated channels, and wherein the inlet port and outlet port are located on one end of one of the first and second plates.

18. The marine engine according to claim 17, wherein the first plate faces the crankcase and encloses the crankcase, wherein the second plate faces the intake plenum and encloses the intake plenum, wherein the cooling apparatus further comprises a first plurality of cooling members extending from the first plate into the crankcase, and further wherein the cooling apparatus comprises a second plurality of cooling members extending from the second plate into the crankcase.

19. The marine engine according to claim 18, wherein the first plurality of cooling members comprises fins and wherein the second plurality of cooling members comprises pins.

20. The marine engine according to claim 19, further comprising a pump that pumps the cooling fluid through the plurality of elongated channels.

* * * * *